United States Patent [19]

Groszstück

[11] 4,344,782
[45] Aug. 17, 1982

[54] APPARATUS FOR THE SEPARATION OF FLUID MIXTURES INTO COMPONENTS OF DIFFERENT MASS

[75] Inventor: Werner Groszstück, Pforzheim, Fed. Rep. of Germany

[73] Assignee: Nustep Trenndüsen Entwicklungs- und Patentverwertungsgesellschaft mbH & Co. KG, Essen, Fed. Rep. of Germany

[21] Appl. No.: 230,106

[22] Filed: Jan. 29, 1981

[30] Foreign Application Priority Data

Jan. 30, 1980 [DE] Fed. Rep. of Germany ....... 3003202

[51] Int. Cl.³ .............................................. B01D 57/50
[52] U.S. Cl. .......................................... 55/397; 55/17
[58] Field of Search ....................... 55/17, 392, 72, 397

[56] References Cited

U.S. PATENT DOCUMENTS

| | | | |
|---|---|---|---|
| 3,362,131 | 1/1968 | Becker | 55/17 |
| 3,708,964 | 1/1973 | Becker et al. | 55/17 |
| 4,033,021 | 7/1977 | Tybas et al. | 55/17 |

FOREIGN PATENT DOCUMENTS

1198328 4/1966 Fed. Rep. of Germany .
2419192 2/1977 Fed. Rep. of Germany .

*Primary Examiner*—Bernard Nozick
*Attorney, Agent, or Firm*—Karl F. Ross

[57] ABSTRACT

An apparatus for the separation of fluid mixtures, i.e. gases or vapor mixtures, especially for isotope separation or enrichment, whereby the gas mixture is subdivided into a heavy fraction or component, a light fraction or component and an intermediate fraction or component. A unitary, preferably cast, body forms passages for the gas mixture, which passages cooperate with outer and inner plates forming as separating elements and fitted against precision-machined surfaces of the cast body these elements defining nozzle edges, two oppositely directed flow-guiding grooves, slots through which the light and medium fractions are withdrawn from the flow across these grooves, and peel-off or skimming members which separate the components of the stream.

4 Claims, 5 Drawing Figures

APPARATUS FOR THE SEPARATION OF FLUID MIXTURES INTO COMPONENTS OF DIFFERENT MASS

FIELD OF THE INVENTION

The present invention relates to an apparatus for the separation of a fluid mixture, e.g. of gas or vapor, into components or fractions by difference in mass. More particularly, the invention relates to an improved apparatus for isotopic separation and particularly for the recovery of light, medium and heavy components from a fluid mixture.

BACKGROUND OF THE INVENTION

While many methods have been used to separate fluid mixtures, e.g. of gas or vapor, by mass difference between components, it has been found that a particularly economical and effective method can make use of the tendency of the components to stratify in zones as the gas mixture is directed at high velocity along a curved flow path.

It is thus known to provide nozzles or jets which direct the fluid mixture along a curved surface and peel-off or skimming baffles or edges which divert a selected portion of the flow from this curved surface to respective channels, thereby separating the mixture into a relatively heavy component or fraction on one side of the skimming edge and a relatively light fraction or component on the opposite side of the skimming edge.

This technique can be used effectively to enrich a gas stream in $U^{235}$, for example, or in general for uranium isotope separation by converting a mixtue of uranium isotopes into compounds of a corresponding gaseous or vapor state, e.g. the uranium hexafluoride, and subjecting the resulting mixture of the hexafluorides of the several uranium isotopes to a peel-off or skimming action, for example enriching the $U^{235}$ hexafluoride content in the light fraction.

It has been proposed heretofore to provide relatively compact apparatus for this purpose utilizing a passage-forming structure into which the gas mixture is fed and which defines passages for the heavy fraction as well, the passages for the mixture opening through nozzle slots into flow-directing grooves or channels in which the stream is intercepted by the peel-off or skimming baffles or edges, thereby deflecting the heavy fraction to the appropriate passages while allowing the light fraction to escape between the nozzle edges and the skimming edges. The passages for the mixture to be separated and for the heavy component which has been separated from the mixture can alternate in the unit.

Such systems, as described in German Pat. No. 24 19 192, column 2, lines 32 to 41, are dependent for their efficiency on the maintenance of strict dimensional and positional tolerances for the components making up the unit.

In German Pat. No. 11 98 328, FIGS. 3 and 4, a complex device for the purposes described is disclosed with various cover plates and elements which must be assembled in a complex manner to form the unit, the assembly operations and the fabrication of the individual components affording opportunities for error and tolerance deviations which are additive or multiplicative.

It is also possible, utilizing these principles, to separate the gas or vapor mixture into three components, namely, a light fraction, a medium fraction and a heavy fraction, as described, for example in the Rosenbaum dissertation Entmischung der Uranisotope in einem Trenndüsensystem mit zweifacher Strahlumlenkung and trifraktionärer Gasabsaugung, Karlsruhe University, Karlsruhe, Germany. In this system two successive nozzle grooves are provided to direct the gas stream along oppositely directed curved paths.

The trifractional separation resulting from this system has advantages in many cases. However, a trifractional separation utilizing the aforedescribed devices cannot be effected without unduly multiplying the number of components and parts of conventional apparatus thereby significantly increasing the assembly and tolerances problems.

OBJECTS OF THE INVENTION

The principal object of the present invention is to provide an improved and simplified apparatus for carrying out trifractional separations without the disadvantages enumerated above.

Another object of this invention is to provide an improved apparatus for the separation of gas and vapor mixtures into light, medium and heavy fractions in a particularly economical and efficient manner without concern for multiplicative and additive tolerances.

Yet another object of the invention is to provide a device which can be simply and economically fabricated for trifractional separation so that fabrication errors are minimized.

SUMMARY OF THE INVENTION

These objects and others which will become apparent hereinafter are attained in a device for the trifractional separation of a fluid mixture which comprises a passage-forming unit comprising a unitary (one-piece) monolithic block formed with a passage for the fluid mixture, a passage for the medium fraction and a passage for the heavy fraction in succession along the block, the three types of passages repeating in succession as well along the block, with each group of three passage corresponding to a respective separating station. The monoblock which can be of generally rectangular plan configuration and cross section, can be formed unitarily with the passage-defining partitions, end wall closing the passages selectively at ends in the direction of travel and lateral walls which are provided with lateral openings accommodating passage-closing elements as will be described in greater detail hereinafter. The one-piece construction is also formed unitarily with connecting slits or openings enabling fluid flow to or between the separating elements.

According to an important feature of the invention, the unitary body, in the region of these connecting slits, is formed with fitting or seating surfaces at which the separating elements of each station are fitted into and onto the body.

For each group of passages forming a separating station and including the gas mixture passage, the medium fraction discharge passage and the heavy fraction discharge passage, the separating element is formed with two flow-guiding grooves defining with portions of this element respective nozzle slots directing the gas stream arcuately in two opposite flow directions.

The unitary body according to the invention, can be fabricated in various ways since the basic body formation is independent of the tolerance requirements for the completed unit. The requisite precision is obtained by the machining and especially the precision machining using conventional material-removal techniques of the aforementioned fitting surfaces to accommodate the separating elements.

Since the machining of all of the fitting surfaces of the unitary body, which can be exposed through the lateral sides thereof, can be carried out in a single chucking or machining operation, e.g. by surface grinding, high tolerances can be obtained especially when the separating elements themselves are precision formed.

The body can be preferably cast by pressure or die casting or poured in conventional mold casting although it is also possible to form the body by forging or even electric discharge machining.

The precision formed separating elements can be made by high precision electrodeposition or other galvanoplastic techniques.

According to a preferred embodiment of the invention, the separating-element unit comprises two plates which may be interconnecting and include a plate turned toward the interior of the body and provided in succession with a nozzle-forming edge extending into one of the flow-deflecting grooves, an outlet for the medium fraction, and a flow splitter in the form of a skimming baffle which divides the stream into the medium and heavy fractions.

Juxtaposed with this plate, each separating element can have an outer plate which, in the same direction, is provided with a nozzle-forming edge reaching into the groove of the first-mentioned or inner plate, an outlet slot for the light fraction and the previously described groove into which the nozzle-forming and skimming portions of the inner plate extend.

The two plates are spacedly juxtaposed to define a narrow flow path extending substantially parallel to the planes of the plates. The medium fraction discharge slit communicates with the connecting slit of the medium fraction passage while the light fraction discharge slit opens outwardly.

According to a feature of the invention, one or each edge of the unitary body is formed with passage-connecting elements for recovering, for example, the medium fraction and/or delivering the mixture or removing the heavy fraction. These connecting fittings do not affect the precision which is simply established by the relationship of the separating units with the monolithic body. The fittings of course do not interact with separating elements and cannot influence the separating function.

The advantages of the present system derive from the fact that the separating elements can be formed as a one-piece unit for each station or at most from two plates for each station, with especially high precision by electrodeposition techniques and can be emplaced in the seats machined with equally high precision in the cast passage-forming body so that all of the tolerances can be preestablished in the separating element or by the precision of the machining of the fitting surfaces.

Additive or multiplicative errors in mounting or fabrication do not occur and trifractional separations can be carried out without the efficiency being limited by tolerance problems. Furthermore, the apparatus can be fabricated inexpensively and in an especially compact form.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
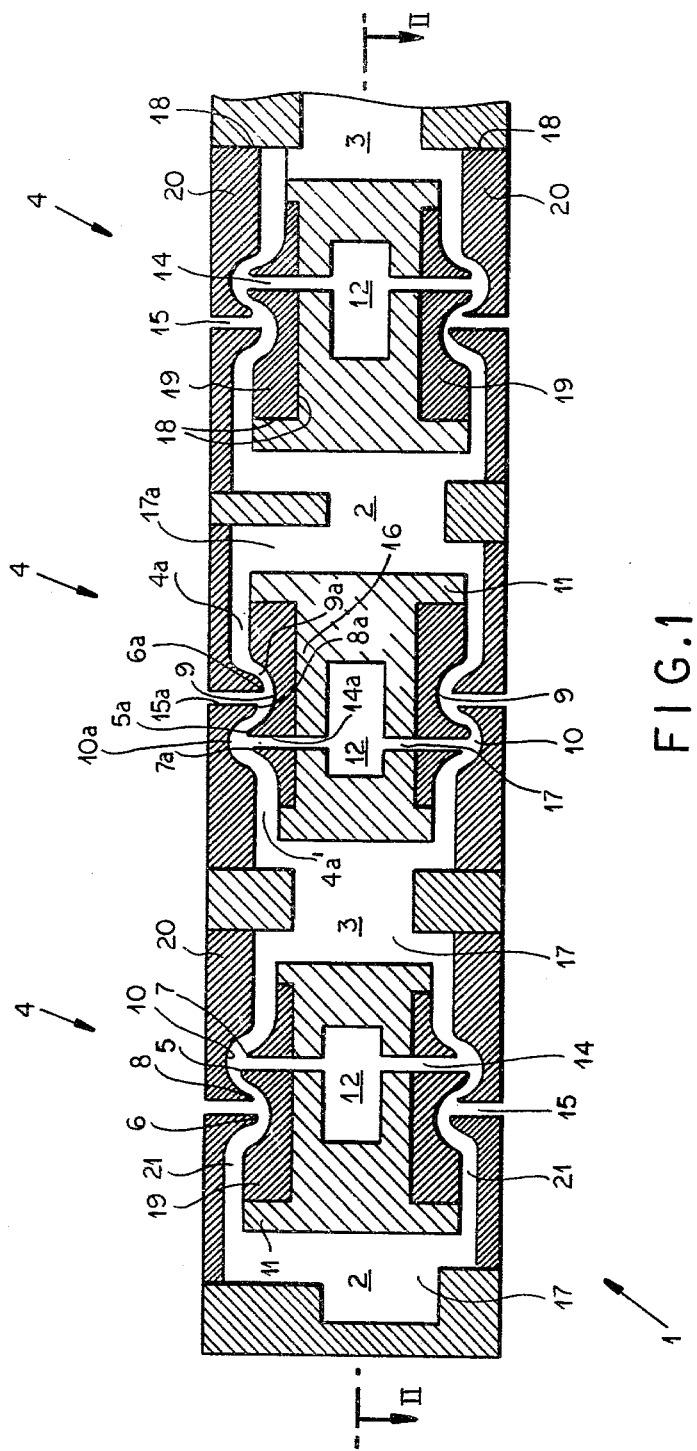
FIG. 1 is a cross-sectional view through a portion of a trifractional separator according to the invention.

The device shown in the drawing can be used for the trifractional separation of fluid mixtures, namely, gases or vapor, and especially for the separation of isotope mixtures such as uranium isotope to recover $U^{235}$ gases such as the hexafluoride in an enriched state in a light fraction and medium and heavy fractions enriched in other uranium isotopes, e.g. $U^{238}$.

The apparatus comprises a passage-forming body 1 of substantially rectangular plan and rectangular cross section and formed with passages 2 and 3 for the incoming or starting gas mixture and for the heavy fraction discharge, respectively.

Formed unitarily with this body are passage-forming partitions 11 which also define discharge passages 12 for the medium fraction. Each set of passages 2, 12, 3 forms a group which is repeated along the unit, each group of passages being associated with a separating station formed by the separating elements 4 each of which includes nozzle-forming edges 5, 6, peel-off or skimming edges or baffles 7, 8 and flow-directing grooves 9, 10.

Figure 2:
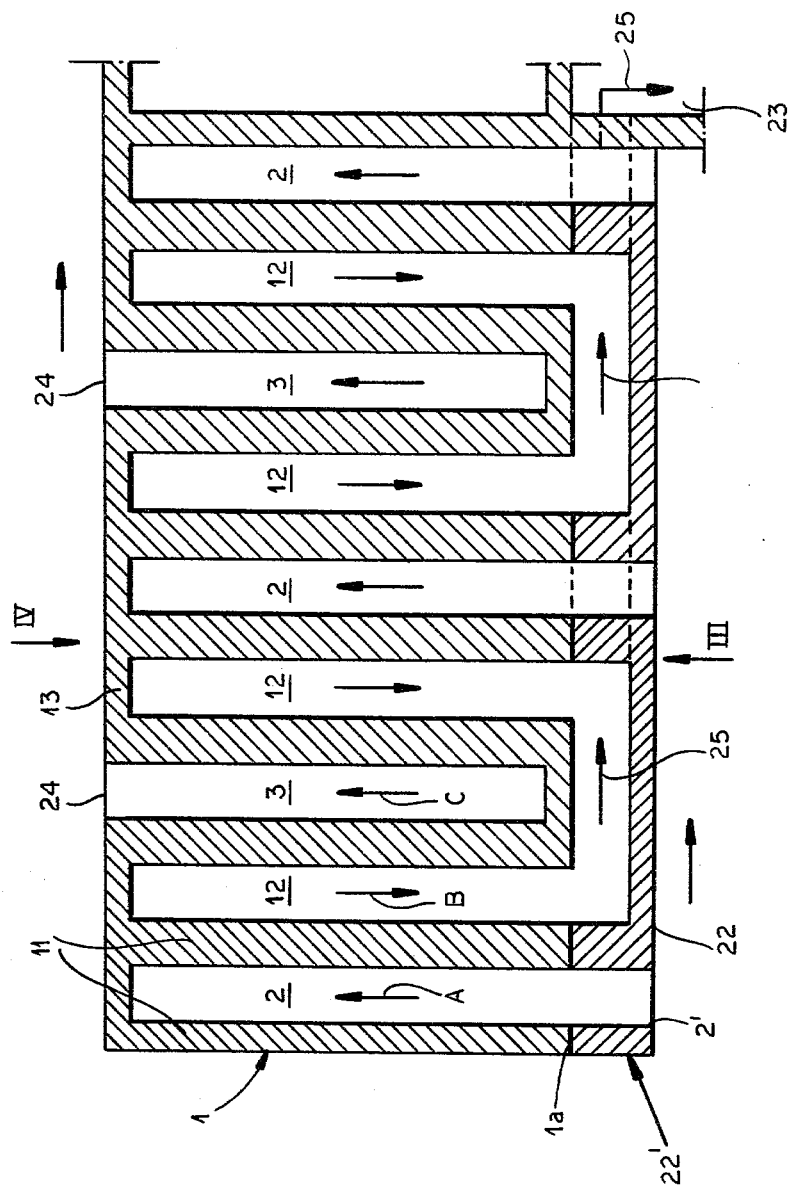
FIG. 2 is a section taken in the longitudinal plane II—II of FIG. 1.
Figure 4:
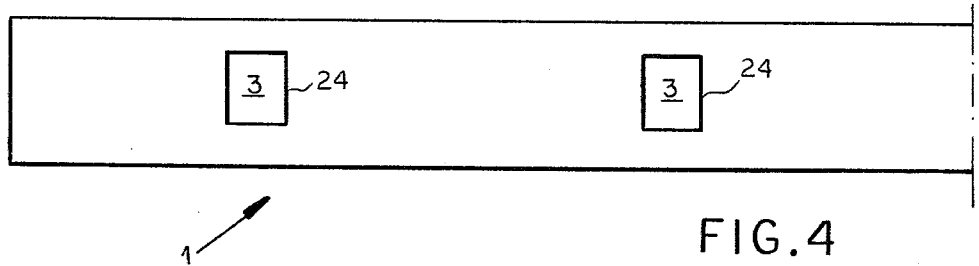
FIG. 4 is an end view in the direction of arrow IV of FIG. 2.
Figure 3:
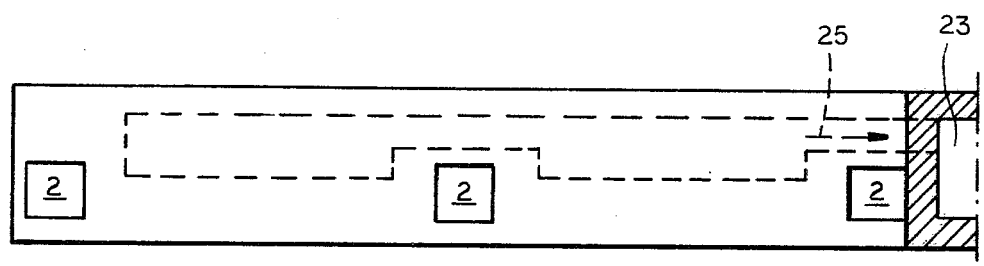
FIG. 3 is an end view in the direction of arrow III in FIG. 2.

As will be apparent from FIG. 2, the passages 2, 12, 3 are open at one end and closed at the opposite end by wall portions 13 so that, for example, as represented by the arrows A, B and C in FIG. 2, the incoming fluid mixture passes upwardly from an opening 2' at the lower end 22 while the medium fraction is discharged downwardly (arrow B) and the heavy fraction is discharged upwardly through openings in the upper end wall at 24. It will be apparent that units such as that shown in the drawing can be stacked for cascading if desired.

The separating elements 4 are mounted upon the body 1 and are formed with slits 14 and 15 which communicate with the medium fraction discharge passage 12 and discharge the light fraction respectively.

Thus, for example, the incoming gas mixture can be fed through one of the flow paths 17a defined within the body 1 and directed along a slot 4a between the opposite sides of one of the separating elements, accelerated by the nozzle-forming edge 6a which defines a narrow gap 9a with the wall of one of the arcuate grooves 9.

The accelerated gas stream sweeps along this wall in an arcuate and clockwise path tending to concentrate the heavier fractions along the outside of the arcuate path and the light fraction along the inner portion of this path thereby allowing the light fraction to be discharged through the slot 15a which is one of the slots 15 previously mentioned.

The light fraction is split from the curved flow path by the skimming edge 8a.

The heavier fractions continue along their path to the nozzle edge 5a at which the gas stream is again accelerated, this time along the oppositely curved wall of the groove 10a, again concentrating the heavier components along the outside of this counterclockwise flow path while lighter components are concentrated along the inner side thereof.

These lighter components form the medium fraction and are split from the stream by the edge 7a so that the medium fraction passes through the slot 14a into the passage 12 while the heavy fraction continues on its path through the slot 4a' into the associated discharge passage 3.

Elements 5a, 6a, 7a, 8a, 10a, 14a and 15a have been identified with letter designations as special cases for the elements without corresponding letters solely to facilitate an understanding of the operation.

It is important to the invention that the unit 1 with its passage-forming partitions 11, closing wall segments 13, passage-defining members 16 be constituted of a single one-piece unit with the passage 2 for the incoming mixture, medium fraction discharge passage 12 and heavy fraction discharge passage 3 in alternating groups adjacent one another.

The reference numeral 17 has been utilized to designate the slot-like openings which communicate between these passages and the respective separating element 4.

The one-piece body is, according to the invention, formed in the region of the connecting openings 17 with fitting surfaces 18 in and against which the members 19 and 20 of the separating element, formed with high precision, are precisely fitted.

The body 1 is preferably formed as a one-piece casting while the separating elements or the parts 19 and 20 thereof are formed by electrodeposition.

Each separating element can comprise an inwardly disposed plate 19 having a flow-directing groove 9, a nozzle edge 5 and a skimming member 7, in the flow direction, as well as a medium fraction discharge gap 14, as described between the respective nozzle edge 5 and skimmer 7.

The other plate 20 has a nozzle edge 6, a flow splitter 8 and a flow-directing groove 10 in the flow direction as well as the gap 15 for discharging the light fraction between edge 6 and the flow splitter 8.

Figure 5:
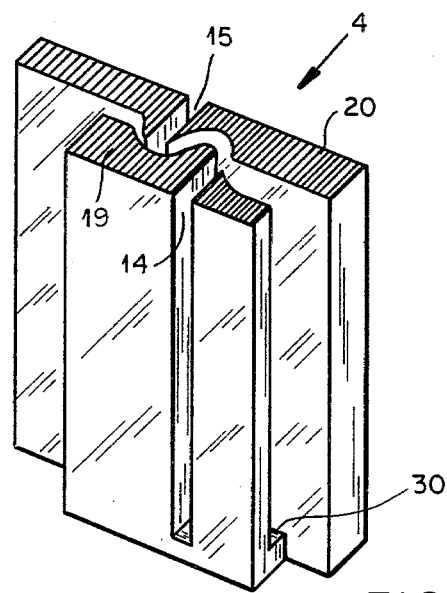
FIG. 5 is a perspective view of a portion of a separating element which can be used in accordance with the present invention.

In FIG. 1, the plates 19 and 20 of each separating element are indicated by different hatching to show that they may be separate members although in FIG. 5 it can be seen that these plates may be formed unitarily with one another at connecting webs 30 (only one shown) at upper and lower ends of the element 4.

The inwardly oriented plate 19 and the outwardly oriented or cover plate 20 of the separating element 4 form the flow passage 21 between them, this passage being parallel to the longitudinal median plane II—II of the body 1.

The end wall 22 can be formed by a separate piece 22' which is affixed to the body 1 at the surface 1a thereof (see FIG. 2) for delivering the gas to the passage 2 and for defining the passage 25 carrying off the medium fraction which discharges into a duct 23.

I claim:

1. A device for the trifractional separation of gas mixtures, especially for isotope separation, comprising:
   a one-piece body of rectangular plan and cross-sectional configuration formed with partitions subdividing the interior thereof into generally parallel fluid mixture passages, medium fraction discharge passages and heavy fraction discharge passages in succession, wall portions closing one end of each of said passages and means defining openings communicating between said passages, said body being formed in the region of said openings with fitting surfaces; and
   a respective separating element for each group of fluid mixture, medium fraction and heavy fraction passages seated in fitting surfaces and defining in succession between each fluid mixture passage and the heavy fraction discharge passage of the respective group, a first nozzle edge for accelerating the fluid mixture, a first flow-directing groove receiving said first nozzle edge for guiding said fluid mixture in an arcuate path, a first flow splitter for separating components of the fluid mixture guided in said arcuate path, a second nozzle edge for directing a component of the fluid mixture from said arcuate path, a second oppositely curved flow-directing groove receiving the fluid mixture from said second nozzle edge and directing same along a second arcuate path, and a second flow splitter intercepting the fluid mixture along said second arcuate path, said separating element further comprising a first slot formed between said first nozzle edge and said first flow splitter for discharging a light fraction of said mixture and a second slot between said second nozzle edge and said flow medium fraction discharge passage, each of said separating elements comprising an inwardly disposed plate formed with said first nozzle-forming edge, said first flow splitter, said first slot and second groove, and with an outwardly lying plate disposed along the exterior of said devices and formed with said first groove, said second nozzle-forming edge, said second flow splitter and second slot, said plates defining a gap between them generally parallel to the plane of said device.

2. The device defined in claim 1 wherein said body is formed as a one-piece casting and said fitting surfaces are precision machined on said body.

3. The device defined in claim 1 or claim 3 wherein said separating elements are formed by precision electrodeposition.

4. The device defined in claim 3 wherein a duct-forming member is affixed along an edge of said body for communication with at least some of said passages.

* * * * *